United States Patent [19]
Leu et al.

[11] Patent Number: 6,053,302
[45] Date of Patent: Apr. 25, 2000

[54] OBJECT SINGULATING AND COUNTING DEVICE

[75] Inventors: Chih-Jen Leu, East Brunswick; Donald R. Pretty, Plainfield, both of N.J.; Eric S. Roller, Northampton, Pa.; Stephen Habakus; Mark M. Magasich, both of Easton, Pa.

[73] Assignee: Geometric Controls Inc., Bethlehem, Pa.

[21] Appl. No.: 09/247,843

[22] Filed: Feb. 10, 1999

[51] Int. Cl.[7] .................................................. B65G 29/00
[52] U.S. Cl. ..................... 198/471.1; 198/803.5; 198/958
[58] Field of Search .............................. 198/419.1, 471.1, 198/803.5, 958; 271/94, 96; 414/736, 737, 675, 800

[56] References Cited

U.S. PATENT DOCUMENTS

| | | |
|---|---|---|
| 3,058,588 | 10/1962 | Palmquist ........................... 414/737 X |
| 3,583,548 | 6/1971 | Cadwallader ........................ 198/471.1 |
| 3,822,008 | 7/1974 | Benner, Jr. et al. .................. 271/96 X |
| 4,013,192 | 3/1977 | Pillon . |
| 4,018,358 | 4/1977 | Johnson et al. ............................ 221/7 |
| 4,047,620 | 9/1977 | Deininger . |
| 4,065,000 | 12/1977 | Murton . |
| 4,111,332 | 9/1978 | Hurst et al. .................................. 221/7 |
| 4,396,828 | 8/1983 | Dino et al. .................................... 377/6 |
| 4,597,091 | 6/1986 | Blake ............................................ 377/6 |
| 4,619,360 | 10/1986 | Taniguchi et al. .................... 198/471.1 |
| 4,697,721 | 10/1987 | Johnson et al. .......................... 221/211 |
| 5,061,145 | 10/1991 | Genis et al. ......................... 414/737 X |
| 5,226,539 | 7/1993 | Cheng ...................................... 206/534 |
| 5,463,839 | 11/1995 | Stange et al. ............................... 53/54 |
| 5,473,703 | 12/1995 | Smith ...................................... 382/143 |
| 5,531,312 | 7/1996 | Dickey ................................ 198/958 X |
| 5,587,572 | 12/1996 | Kirby ................................... 235/98 R |

FOREIGN PATENT DOCUMENTS

0257773  3/1988  European Pat. Off. .

*Primary Examiner*—Janice L. Krizek
*Attorney, Agent, or Firm*—Christopher J. Whewell

[57] ABSTRACT

Disclosed herein is a device for counting small objects which is capable of accurately and reliably counting large numbers of small objects such as pharmaceutical tablets, capsules, and the like. The device employs linear pickup tubes radially affixed to a rotating collar wherein the tubes have a vacuum applied to them during a prescribed amount of rotation of the collar about a stationary axle. During the period for which a vacuum exists at the tip of a pickup tube, an object to be counted is caused to adhere to the tube end, and is transported into a discharge chute containing an object counter.

36 Claims, 8 Drawing Sheets

OBJECT SINGULATING AND COUNTING DEVICE

This invention relates to a device and method for the automated singulation and counting of small objects. The device disclosed is particularly useful for accurately counting large numbers of small objects including, but not limited to objects such as capsules, pills, and the like.

BACKGROUND

Since the earliest of times when it has been found necessary or desirable to mete out a prescribed number of small objects, the tedious labor of one or more individuals to physically count out the number of small objects required for a given scenario was typically required. The labors of individuals have been necessary, for example, in counting various commodities of trade including coins, gemstones, pills, or virtually any small object to be conveyed for which exact quantification knowledge is necessary. Owing to the labor-intensive nature of the counting of a large number of small objects, the prior art has become replete with contrivances designed to automatically count large numbers of small objects.

One important application of devices for counting large numbers of small objects is in the pharmaceutical trade, at both the manufacturing and consumer usage stages. In the former, manufacturing facilities must have means at their disposal for accurately counting the number of acceptable pills they produce. For the latter, pharmacists typically count out pills to be dispensed from a storage container. While manual counting is generally reliable, there have undoubtedly been numerous cases in which an incorrect number of pills were dispensed by the pharmacist to the patient. Additionally, the manual process of counting is time-consuming from the pharmacist's point of view, whose time is more effectively spent performing tasks specific to her training.

Typically, devices designed to count small objects include inherent design limitations that render them suitable for use only in counting objects possessing a particular set of size and shape characteristics. Also, the counting devices found in the prior art are generally complex in design, and contain a relatively large number of moving parts which render the devices as a whole more expensive and prone to maintenance.

For example, U.S. Pat. No. 4,047,620 describes a counter for objects having a tray containing a plurality of recesses therein, in which the number of recesses in which objects are to settle is variable by means of a movable slider. This type of device is intended for use by pharmacists in counting the number of pills or capsules to be dispensed to a consumer. However, this device is suitable only for the manual counting of pills having a physical shape which falls within certain size limitations.

U.S. Pat. No. 4,065,000 discloses a tablet or capsule counter having a slotted plate with a single row of slots and a rectangular counting plate slidably disposed on the slotted plate for parallel movement of the plates with respect to one another, and a slidably movable partition between the slotted plate and the base in which the whole is contained. The number of slots in the slotted plate are equal to the number of rows of openings in the counting plate, wherein the rows of openings in the counting plate are spaced apart at a distance equal to the spacings of the slots, and the width of the slots is equal to or larger than the holes on the openings in the counting plate. Again, this device is limited to only being able to count objects having very discrete physical sizes.

U.S. Pat. No. 4,013,192 to Pillon teaches a commercial pill or tablet counter using a photoelectric sensor to determine the number of pills dispensed into a bottle. A bowl for containing the pills to be counted is fitted with a network of spiraling vanes or ribs which cooperate to controllably transport the pills to be counted upwardly to a ledge having a solenoid-controlled gate means having two positions. Once a pre-determined quantity of pills have been caused to pass beyond the sensor into a desired container, the gate solenoid is activated thus causing the remaining transported pills to fall into a separate container, such as a stock bottle.

U.S. Pat. No. 4,018,358 to Johnson et al. describes a self-contained pill counting device which comprises two systems, one for providing a vacuum, and the other for driving a pill-bearing casette. The cassette contains a complex, sealed pill counting system, including a reservoir zone of pills, and a disc-like, pill conveying wheel upon which the pills are forced to reside by virtue of a complex routing of vacuum passageways. The pills are held in place at holes located on the surface of the wheel and are transported past a sensor, after which they are forced off the wheel's surface by a separator into a chute which is channeled to deliver the pills to a storage bottle.

U.S. Pat. No. 4,111,332 to Hurst et al. describes a pill dispensing device which employs an inclined pill reservoir having a rotating disk-like bottom portion connected to a motor. The bottom portion is caused to rotate, and pills are dispensed by virtue of a circumferential series of radial and angularly-spaced pill-receiving slots which are undercut in the bottom of the hopper.

U.S. Pat. No. 4,396,828 of Dino et al. teaches an inclined housing with an entrance chute which contains a removable tray having one end underlying the chute and the other end located at a lower position. A photoelectric counter is mounted in the housing to count pills as they pass from one end of the tray to the other, and the quantity is displayed on a digital readout.

U.S. Pat. No. 4,597,091 to Blake discloses a pill counter having an inclined helical ramp, arcuate in cross-section which has a pill-receiving portion at one end, a pill counting means including a dislpay downstream of the pill-receiving portion, and a pill-collecting means for gathering the pills once their quantity has been detected.

U.S. Pat. No. 4,697,721 to Johnson et al. purports to be an improvement over the '358 patent to Johnson et al., wherein the improvement includes on offset mounting of the agitator and its flexible fingers with respect to the center of rotation of the pill-conveying wheel, and the modification of the adjusting shoe for prevention of the transport of more than one pill by a given hole on the conveying wheel.

U.S. Pat. No. 5,226,539 to Cheng teaches a pill dispenser/counter having upper and a lower circular container parts, with the upper part mounted atop the lower part. The upper part has a plurality of compartments arranged in a circular configuration, wherein each compartment of the upper part contains one day's supply of pills. A door and detent mechanism are affixed to the upper compartment. The door is actuated by a mechanical linkage connected to a counter, and one is thus able to monitor the number of times the access door for the medicine has been actuated in a given time period.

U.S. Pat. No. 5,463,839 to Stange et al. discloses a counting device comprising a feed tray including a guide path and having a plurality of provisions for singularizing the objects, a means for advancing the objects along the guide path, a means for counting the objects, a means for controlling or stopping the advancement of the objects once the preset quantity has been reached, and electronic control means for coordinating the actions of the advancement control and the advance means.

U.S. Pat. No. 5,473,703 to Smith sets forth and advancement in the art of using vibratory motion to sort and count objects. The device comprises a feeder having an oscillating means and oscillation amplitude sensor coupled thereto such that the oscillations cause the objects being counted to exit the output opening of the feeder one at a time, a receiving means for catching the objects, a sensing means for registering each object received by the receiving means, a counting means, and a control means for controlling the oscillations using data from the signal received from the oscillation amplitude sensor and the sensing means used for registering each object received by the receiving means.

U.S. Pat. No. 5,587,572 to Kirby teaches a counter for tablets and the like having a hopper with a wide bottom opening for supplying the tablets. A channeling member channels the tablets from the hopper to a counting device in single file fashion, and spaced sufficiently so as to not confuse the counter. The channeling member is v-shaped in cross section, adjustably inclined, and vibratory energy is used as the motive force for the transportation.

European Patent Application 0257773 to Graham discloses the use of a transportation channel which is v-shaped in cross section in combination with vibratory energy supplied by two separate vibratory sources wherein the first vibratory source causes items to flow from the feed gate of a hopper and the second vibratory source funnels the items in single-file fashion to a slot in the base of the transportation channel.

While the foregoing patents and patent application generally describe the means available and known in the art for counting pills, the general principles of operation under which these various devices function are believed to be equally sufficient for counting of small objects other than pills, provided that minor design alterations are first made to accommodate the size and shape of the objects which are desired to be counted. However, commensurate with such modification are imported the limitations on the size and shape of the objects to be counted, that is, even once modified, the devices of prior art remain capable of only counting objects having certain a certain size and shape. It would therefore be desirable to have on hand a device which is capable of reliably counting a large number of small objects and which is not limited by the size and/or shape of the objects, as the devices of the prior art are so limited.

SUMMARY OF THE INVENTION

The device of the instant invention, in its simplest form, comprises an essentially cylindrically-shaped axle portion having a round outer circumference upon which resides a ring-like collar portion having an inner diameter and inner surface, an outer diameter and outer surface, wherein the inner diameter of the collar is slightly larger than the round outer circumference of the axle portion, hence making the collar portion adapted to be rotatable about the axle portion. In use, the axle is positioned so that its axis is essentially perpendicular to the direction of the force of gravity. The collar portion includes at least one, and preferably a plurality of, holes disposed on its outer surface, which is in contact with the axle, the centerline of said hole(s) being perpendicular to a diameter dimension of the collar. The hole(s) go all the way through the thickness dimension of the collar, which is simply the difference between its outer and inner diameter. The axle has, in one form of the invention, a groove machined on the axle surface upon which the collar rotates. The groove serves as a vacuum channel for communicating a vacuum from a low-pressure region contained within a hollow portion disposed in the interior of the axle to the hole(s) on the surface of the collar. The collar has one hollow pickup tube radially disposed about each of the hole(s) on the collar and located directly over the hole(s) in the collar such that vacuum communicated to the holes is effectively communicated through the pickup tubes and is available at the tip of the pickup tube(s), which are preferably of identical length to one another and are linear. In another embodiment, the pickup tubes are curved. By having the machined groove on the surface of the axle only extending about the axle a pre-selected number of degrees about the circumference of the axle, it is possible to control the amount of time, as measured in degrees of rotation of the collar, for which a vacuum is available at the tip of a given pickup tube. The invention also includes a vacuum source, a means for counting objects which are transported by the pickup tubes, a means for causing rotation of the collar about the axle, and a mounting location for the axle, which is preferably stationary.

During its use as a counting device, the collar is located about the axle, and the axle is affixed in a location which ensures that the tip of at least one pickup tube comes into close enough proximity, and preferably actual physical contact with an object which is to be counted. Vacuum is applied to the groove machined on the outer surface of the axle on which the collar rotates from the vacuum source through the usual means for communicating pressures other than atmospheric, including pipes, tubing, drilled or cast-in passageways and features, through suitable passages contained within the axle and its mounting and other wares. The means for causing rotation of the collar is set into motion, and as the collar rotates, the vacuum at the tip of the pickup tube causes an object to be counted (which is in the immediate vicinity of the pickup tube end) to stick to the end of the pickup tube. The object is then transported as the collar rotates to a discharge chute that either contains or has at or in sufficient close proximity to its entrance a means for counting the objects deposited therein.

In the most preferred form of the invention, the above construct is a self-contained unit in which the aforesaid elements are contained within a box-like enclosure having an interior volume that is defined by a top portion, a bottom portion, two side portions, a rear portion, and a front portion, which are preferably separate elements. In another embodiment, the top portion, bottom portion, side portions, and front portion may be of a singular construction containing all or a subcombination of the foregoing and fabricated, for example, by injection molding. The front portion has a loading hole disposed thereon in close proximity to the bottom portion. There is also a feed chute used for loading the device of this invention with objects to be counted. The feed chute has a loading opening and a discharge portion and is disposed on the front portion so that its discharge portion is in contact with the loading hole. In the open interior volume of the enclosure, the axle portion is affixed securely to the rear portion.

The axle is generally a solid cylinder with two end portions and having an inner passageway along or in the vicinity of its centerline for communicating a vacuum applied to one end of the axle to, in one embodiment, a groove or slot on the exterior surface of the cylindrically-shaped axle upon which the collar portion rotates. In another embodiment, there is a crescent-shaped absence of material on the axle portion over which the collar rotates that permits communication of the vacuum. The rotating collar means is a ring-shaped sleeve that is dimensioned to just slip over the axle and is accordingly rotably mounted with respect thereto. The ring-shaped collar is readily rotatable about the axle, and has holes on its surface which pass through its surface. Onto the outer surface of the ring-shaped rotating collar, mounted directly over the holes thereon, are radially disposed one hollow pickup tube for each of the holes. The pickup tubes are hollow throughout their length, and are mounted to the collar so that a vacuum applied to the low pressure region or hole in the axle is communicated to the ends of the pickup tubes by virtue of the inner passageway and groove, or inner passageway and absence of material.

There is also provided a means for causing rotation of said rotating collar, which may include an electrical motor or other conventional drive means and conventional means for communicating the motive energy to the rotating collar including, but not limited to drive belts, pulleys, and the like, as the use of such and other wares is well known to artisans of ordinary skill in causing rotation of wheels, gears, pulleys, or other similar objects capable of rotational motion. A discharge chute having an opening portion and an exit portion, in which the discharge tube is located preferably in, and alternatively adjacent to, and alternatively tangential to, the path of an object adhering to the tips of the pickup tubes by virtue of the vacuum, is provided for the objects which are to be counted to be deposited. A counting means is located within said discharge chute to register the number of objects deposited therein. The counting means is connected to a microprocessor or other conventional electronic counting means as are known to those in the electronics field.

During operation of the invention, a vacuum is supplied to the center of the axle by connection ot an end portion of the axle as more clearly shown in the drawings and described elsewhere herein, and the means for causing rotation of the rotating collar is energized. As the collar rotates, the vacuum communicated to the ends of the pickup tubes causes one of the objects to be counted that is contained in the sample reservoir to adhere to the end of a given pickup tube. Transportation of the object to be counted continues until the object to be counted has been moved, by virtue of the collar's rotation, from the sample reservoir to the opening of the discharge chute, at which point the vacuum is caused to be ceased owing to the configuration of vacuum groove on the axle, or absence of material. The object to be counted is caused to be deposited into the discharge chute by either the force of inertia resulting from the angular velocity of the pill resultant from its travel on the end of a pickup tube or the force of gravity, or a combination of these forces, past a counting means, which may be a photoelectric sensing means (including but not limited to infrared) or other electronic sensing device which lends itself well to high speed and microprocessor interfacing, and which is well-known to artisans of ordinary skill. The counting means may also comprise mechanical counting means, such as a slightly mechanically-biased door connected to a mechanical counter which the objects actuate owing to gravity or the combination thereof with the inertial forces mentioned above. Rotation of the collar continues until the counter has reached a desired number, at which time an alarm is sounded or the achievement of the count otherwise communicated, and the trap door is preferably caused to be mechanically biased so as to close off access to the discharge chute thus preventing further deposition of objects to be counted in the discharge chute. The means for causing rotation of the collar is also preferably disengaged at this time.

DETAILED DESCRIPTION INCLUDING A PREFERRED EMBODIMENT

The present invention is a device for transporting objects contained in a reservoir or storage area to a location in which the objects can be and automatically counted prior to their further handling which may include storage or packaging. Referring to the drawings and initially to FIG. 1 there is shown a perspective phantom view of the apparatus according to this invention. In this figure the various components and machinations of the device 10 are depicted in their preferred orientations within a box-like enclosure, in the preferred form of the invention. Therein, the rotating collar 60 is seen located upon the fixed axle 62 about which it rotates. The rotating collar 60 is caused to spin by virtue of rotational motion conveyed to it by drive means 54 which is a drive belt and is in mechanical contact with the output shaft 52 of electrical motor 50.

Figure 1:
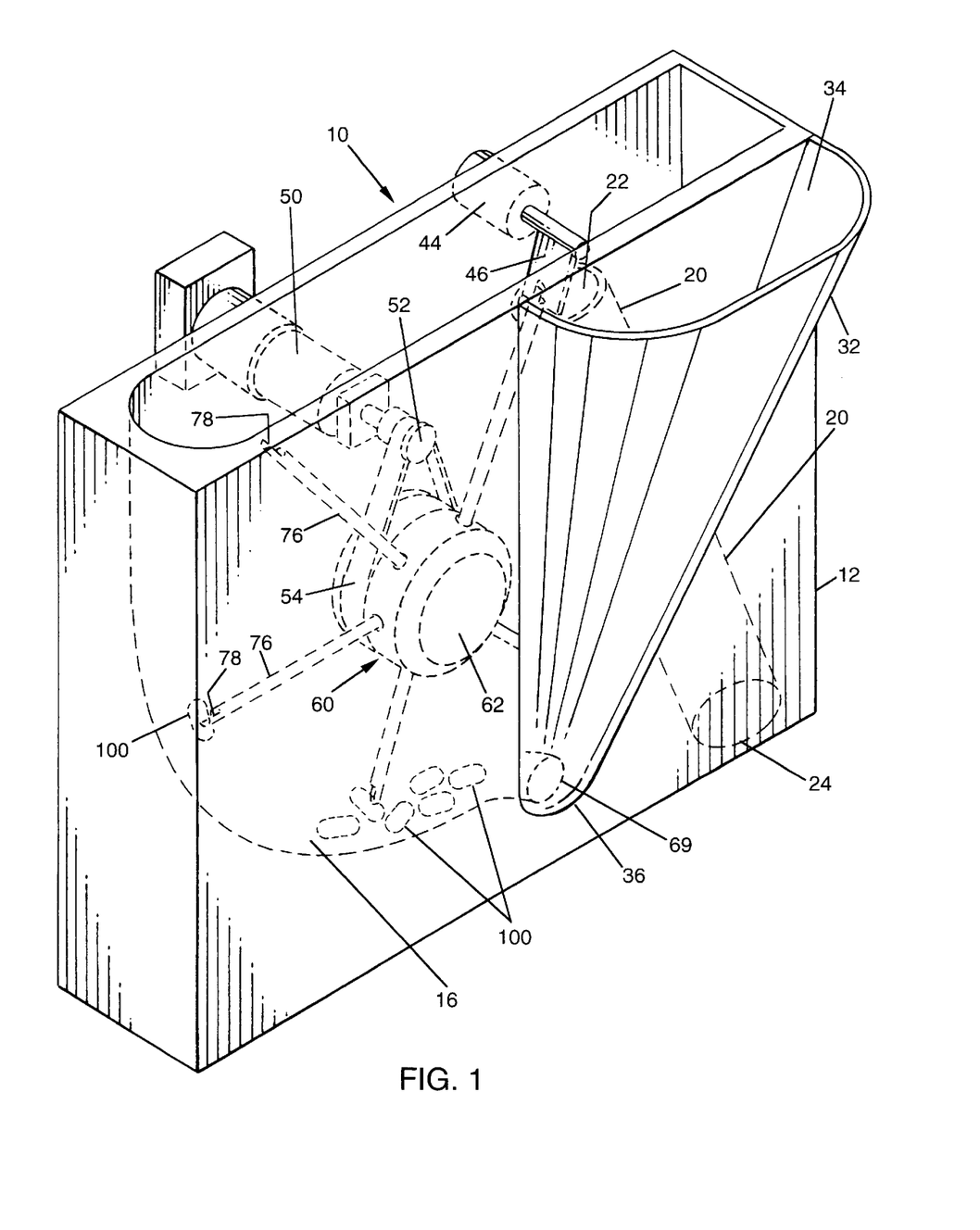
FIG. 1 is a perspective phantom view of the apparatus according to this invention.

The hollow pickup tubes 76 are shown in their positions attached to and disposed radially about the rotating collar. The pickup tubes are preferably round in cross section and hence cylindrical in shape and have truncated tips. However, the shape of the tip of the pickup tube is preferably made to take on the contour of the objects being counted, to whatever extent necessary for causing an object to be counted to adhere to the tip of the tubes when a vacuum is applied. For example, as viewed from the side, the tube ends may be convex, concave, or flat. The cross section of the tubes may be of any shape, provided there is a passageway through which vacuum may be communicated from the collar to the tips, but they are preferably round in cross-section. Alternatively, for objects which are irregularly shaped, extra heavy, or otherwise cumbersome with respect to being picked up by virtue of the presence of a vacuum at the end of a pickup tube, the tips of the pickup tubes may have disposed on them an adhesive or slightly tacky substance, as such are well-known to those of ordinary skill in the chemical arts, which promotes the adherence of the object to be counted to the tip of the pickup tube by providing the extra sufficient adhesive forces necessary to hold the object at the tip of the pickup tube. Upon cessation of the vacuum, the extra adhesion conferred by the tacky or adhesive substance is not by itself sufficient for holding the object at the end of the pickup tube, and the object may then be readily communicated to the discharge chute or counting means. For this, adhesive substances known in the adhesive art may be used, including, but not limited to formulations which include amorphous polyalpha olefin polymers manufactured by Huntsman Polymers Corporation of Odessa, Tex.

In the embodiment of FIG. 1, the direction of rotation of the rotating collar is clockwise as viewed from the front 12 of the device, although rotation may also be counterclockwise, provided that the discharge chute is relocated accordingly. Located on the front 12 of the device is the feed chute 32 having a loading opening 34 and a discharge portion 36. The discharge portion is funnel-shaped and the small end is located at an opening 69 in the front portion of the device so that any small objects to be counted, such as pills 100, placed in loading opening 34 are caused to enter the hole 69 by virtue of gravitational forces. At the bottom of the interior of the device is a reservoir area 16 in which a plurality of the objects to be counted, in this instance pills 100, have been caused to reside by virtue of their being fed into loading opening 34.

During operation of the device, the rotating collar 60 is caused to rotate about axle 62 by virtue of motive force conferred to the axle by drive belt 54, which is in mechanical contact with motor 50 by means of a pulley located on the output shaft 52 of the motor. A vacuum is caused to exist at the tips 78 of the pickup tubes 76 which causes an object to be counted, such as a pill 100, to be held securely at the tip of the pickup tube when the tip of the pickup tube is sufficiently close to an object to be counted. After sufficient rotation of the collar 60, the pill 100 is caused to be located at the opening 22 of the discharge chute 20. By vacuum control means defined elsewhere herein, the vacuum applied to the pickup tube is caused to cease when the pill 100 is near or at the opening of the exit chute 20. Therefore, the pill, by either of or a combination of both the forces of inertia owing to the angular velocity of the pill and gravitational forces is caused to enter the discharge chute, where it is chambered to a suitable location, which is preferably a container located at the exit portion 24 of the discharge chute. During its falling travel through the discharge chute, the object to be counted moves past or through a counting means or sensor (not shown) which senses and keeps a count of the number of objects which pass through the chute. The counting means is preferably electronic, and communicates the counts to a microprocessor to which it is connected, by means known to those in the electrical arts. After a predetermined number of objects have passed the counter, the microprocessor triggers a means 44 for actuating trap door 46 from an open position to a closed position with respect to the discharge tube and thus causes the door to close off the discharge chute, thereby denying entry of any further objects to the discharge chute. The counting means may also provide a trigger voltage to a transducer, such as an alarm, microprocessor, or other electronic device.

Figure 2:
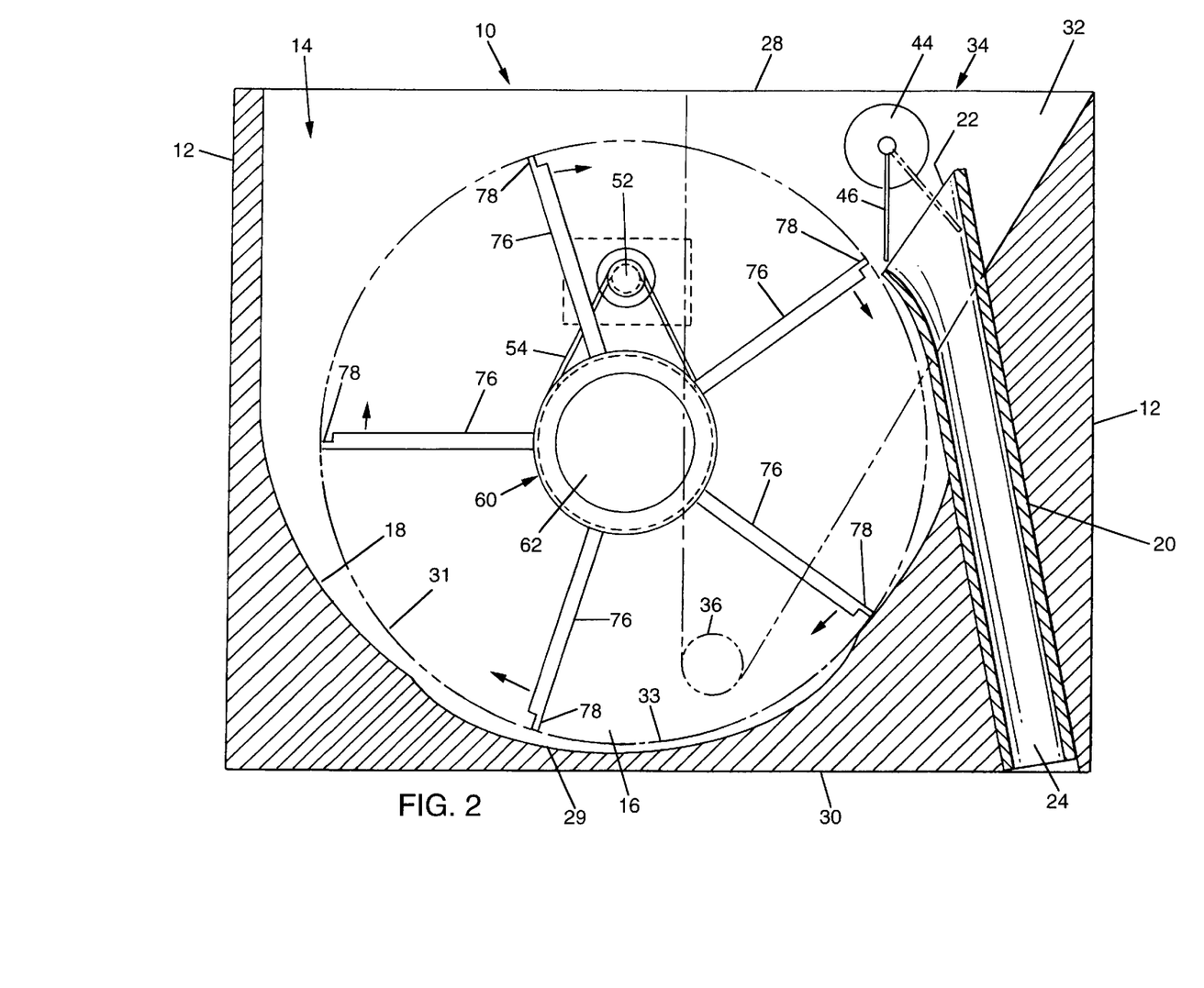
FIG. 2 is a frontal sectional view of the apparatus according to this invention.

In FIG. 2 is shown a front sectional view which depicts the relationship between the various elements of the invention and their respective locations in the preferred embodiment, including the rotating collar 60, pickup tubes 76, feed chute 32, exit chute 20, and the output shaft 52 of the drive motor. Herein shown is the most preferred embodiment of the profile of the reservoir where objects to be counted are housed en masse showing two separate radii of curvature of the enclosure inner countour 29 and 18, and also showing the path 31 which the tips of the pickup tubes trace out during normal rotation of the collar. The use of two different radii of curvature assists in the successful attachment of an object to be counted to the end of the pickup tube.

Figure 3:
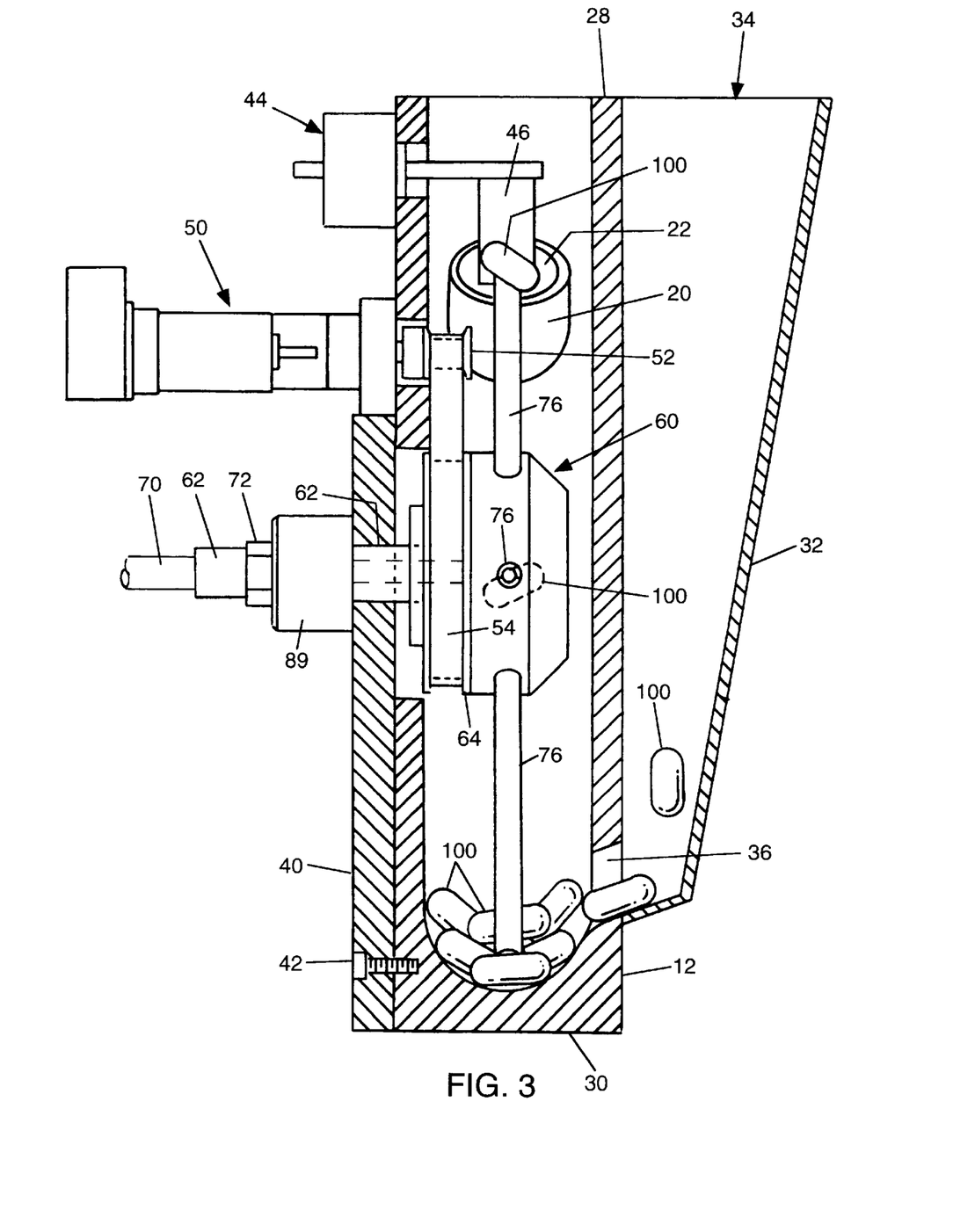
FIG. 3 is a left-side partial sectional view of the apparatus according to this invention.

FIG. 3 is a left-side partial sectional view of the apparatus showing the spatial relationship between the various elements of the invention 10 including feed chute 34, drive motor 50 and the output shaft 52 upon which drive means 54 is in mechanical contact. The rotating collar 60 includes a pulley portion 64, and the collar is depicted mounted on axle portion 62, having vacuum passageway passing therethrough, more clearly depicted in FIG. 4, as an inner region in which a lower than atmospheric pressure exists owing to its being effectively communicated by the vacuum source at 70.

Figure 4:
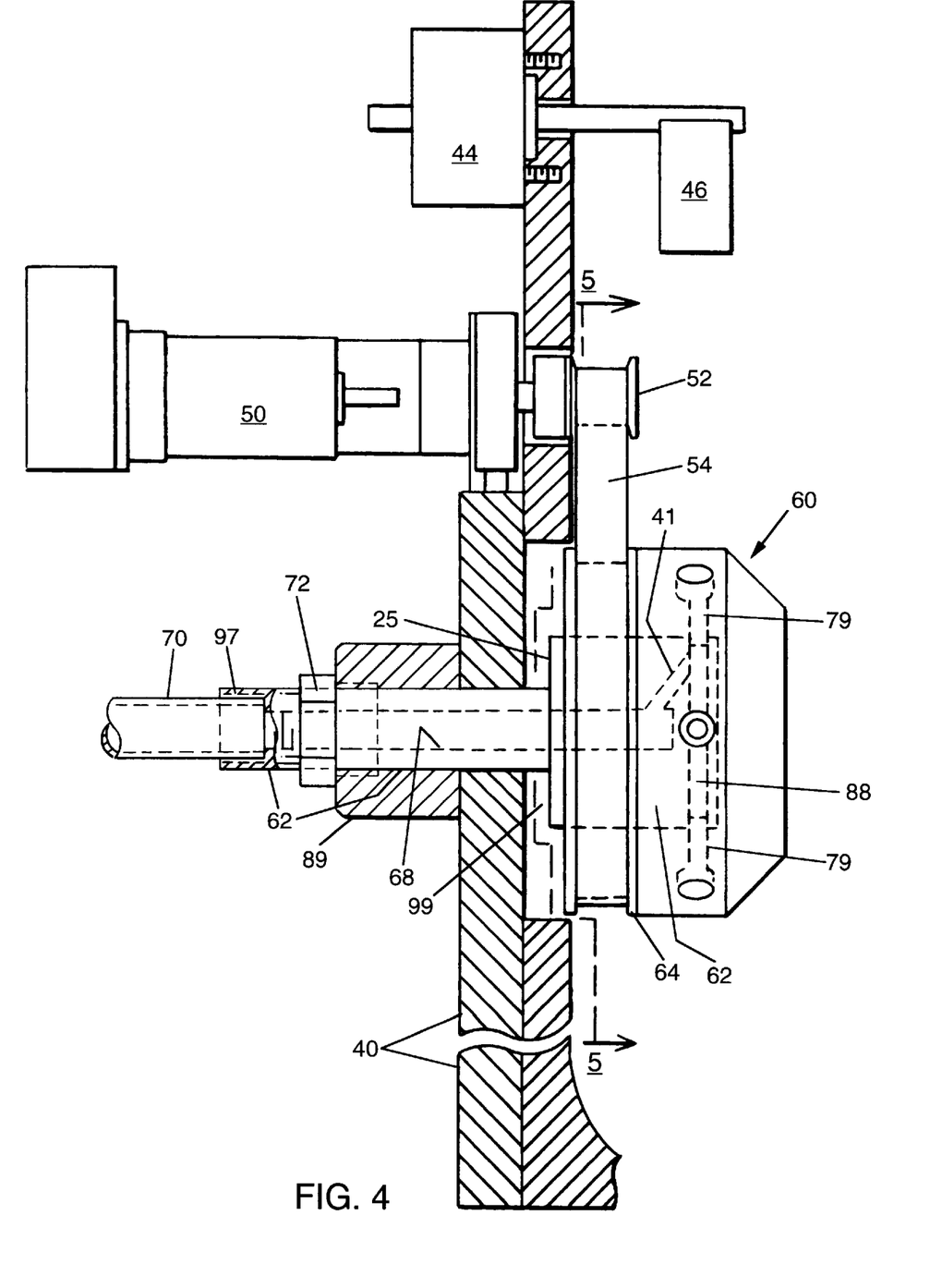
FIG. 4 is an enlarged detail view showing the back plate, drive motor, vacuum hub, pulleys, and drive belt of the invention.
Figure 5:
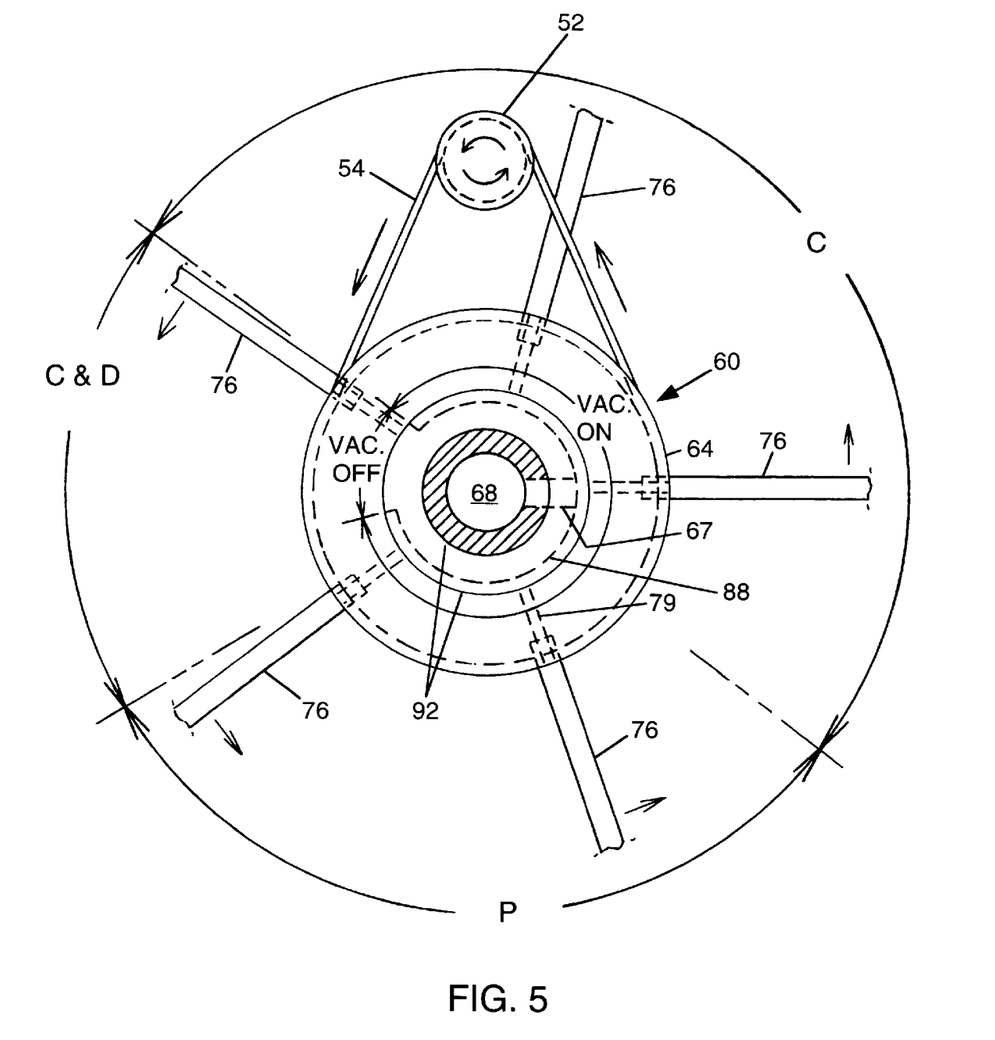
FIG. 5 is a section showing the rotating collar and the vacuum timing cycle, wherein the section is taken through line 5—5 on FIG. 4.

In FIG. 4 is shown an enlarged detail view showing the preferred physical configuration and relationship between a stationary planar surface 40 to which the axle is mounted, which in this case is the rear portion of the enclosure previously described, and the drive motor, fixed axle, pulleys, and drive belt of the invention. In this figure the securing nut 72 is shown disposed on external threads about that portion of the axle 62 which is adapted to receive vacuum source 70. In this embodiment, the vacuum connection from the source 70 is by virtue of threads on the inner portion of the end of 62 and the outer portion of source tube 70, although other means known to those skilled in the art for connecting tubing, including without limitation swaging, may be employed as functional equivalents. Passageway 68 conveys vacuum supplied to main vacuum inlet connection tube 70 to the secondary vacuum passageway 41 within the axle. From 41 the vacuum is conveyed to the groove 88 in the outer surface of that portion of the cylindrical axle 62 upon which collar 60 rotates, as is more clearly shown in FIG. 7. The rear surface 25 of stationary axle 62 is held in rigid position against the stationary wall 40 of the device by means of nut 72 being tightened about threads disposed on the external portion of axle 62 against cylindrically-shaped spacer 89, which has a hole through its centerline of sufficient diameter to loosely accommodate the tubular portion of axle 62 which is adapted to receive vacuum source 70. In this embodiment there is shown a space 99 between the back side of the axle and the wall 40, which may be filled optionally with a lockwasher or other washer (not shown). The vacuum is communicated from source 70 into vacuum passageway 68. From passageway 68 the vacuum is communicated to semi-circular groove 88 (FIG. 7) by means of secondary passageway 41. Loosening of nut 72 permits adjustment of the position of axle 62 by way of rotation with respect to the rest of the device as a whole, thereby permitting the location of the groove 88 (see FIG. 7) with respect to the device as a whole to be readily adjusted, so as to provide a simple means for adjusting the exact timing of when the object to be counted is released from the end of the pickup tube. This arrangement also provides for rigid attachment of the axle to the rear portion of the device when the nut is tightened, in the preferred embodiment of the invention. Also shown in FIG. 4 are holes 79 included on the outer surface of the collar portion 60, the centerline of which holes are perpendicular to the a diameter dimension of the collar, and wherein the holes go all the way through the thickness dimension of the collar. FIG. 5 also shows their respective locations.

In FIG. 5 is shown a section of the rotating collar and the groove 88 depicting the means by which the vacuum timing cycle is effected in a preferred form of the invention. As shown therein, groove 88 does not extend around the entire perimeter of the portion of the axle 62 upon which the collar portion 60 rotates, but only for the amount of rotation for which the application of vacuum is desired. This groove may be machined, cast-in, or otherwise caused to exist on the outer surface of the axle for any desired number of degrees of rotation. It is preferable that the vacuum be available at the tip of a given pickup tube after about 10 degrees of rotation after the tip of the pickup tube has passed the discharge chute, and it is preferable that the vacuum be ceased at about 20 degrees of rotation before the tip of the pickup tube reaches the discharge chute. Most preferably, however, the amount of rotation for which it is desired to have the vacuum on at the tip portion 78 of a given pickup tube 76 is between 100 and 330 degrees with 225 degrees being most preferable. In this figure, the portion of the rotation labeled "P" is the approximate location at which the pickup tubes are cabable of picking up an object 100, "C" is the approximate region of travel during which the object 100 is being carried, and "C&D" is the approximate region of travel of the pickup tubes during the counting and depositing of the objects.

Figure 6:
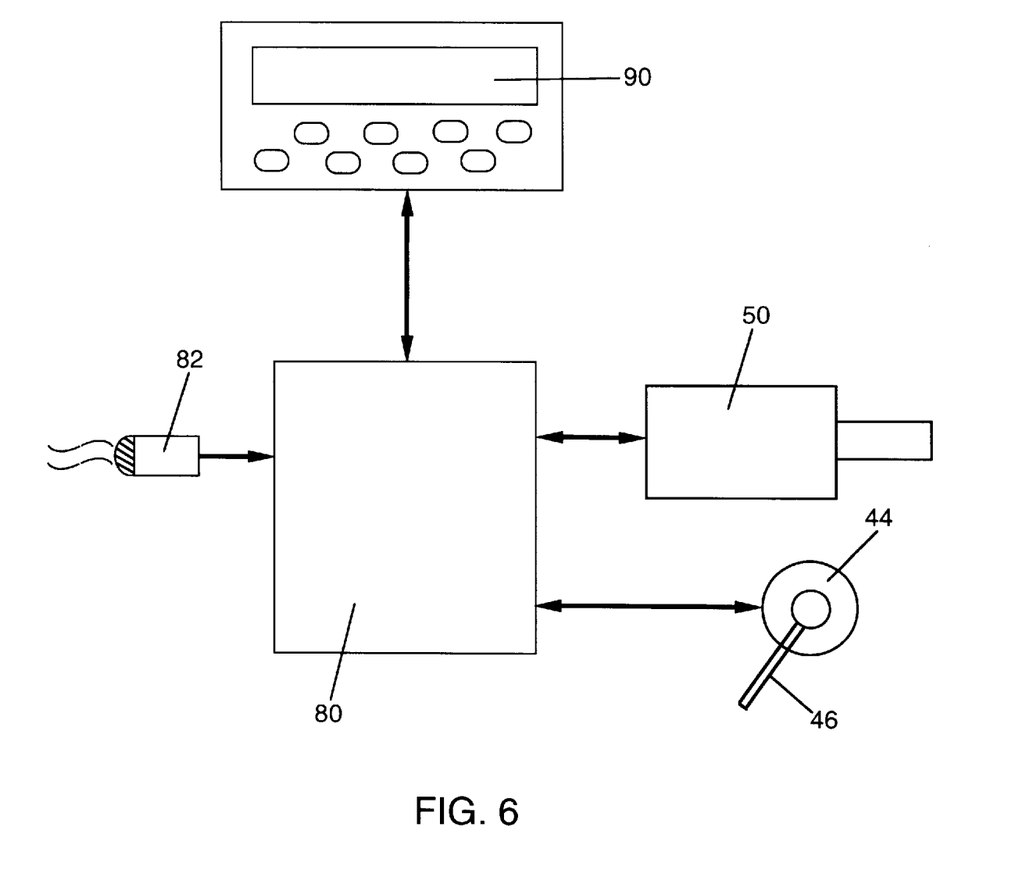
FIG. 6 is a schematic view showing a block diagram of the electrical and control features of the invention.

In FIG. 6 is shown a schematic view showing typical electrical and control features useful in the invention, including a microprocessor 80, which is preferably a programmable logic controller, to which actuating means 44, display 90, motive means 50, and counting means 82 are attached.

Figure 7:
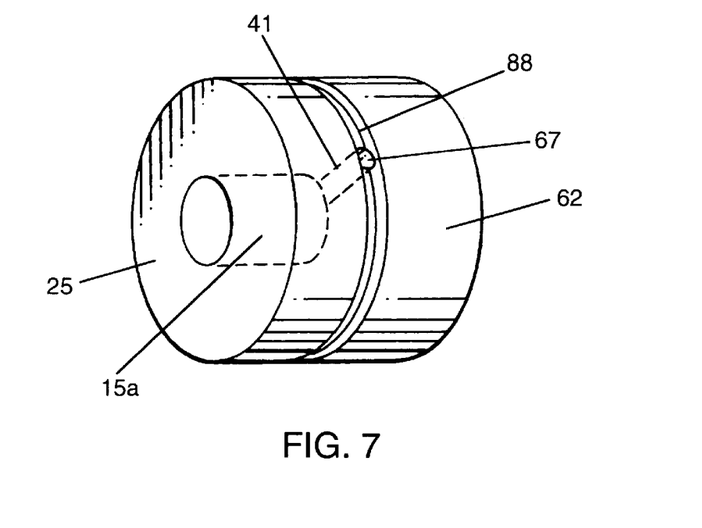
FIG. 7 is a perspective phantom view of the axle upon which the rotating collar rotates, as shown in FIGS. 1 through 5, showing the passageways through which vacuum is communicated to the groove in the axle.

FIG. 7 shows a perspective view of the end portion 62*a* of axle 62 upon which the rotating collar 60 rotates, and illustrates the relationship of the secondary passage 41, end portion 15*a* of passageway 68, groove 88 and hole 67.

Figure 8:
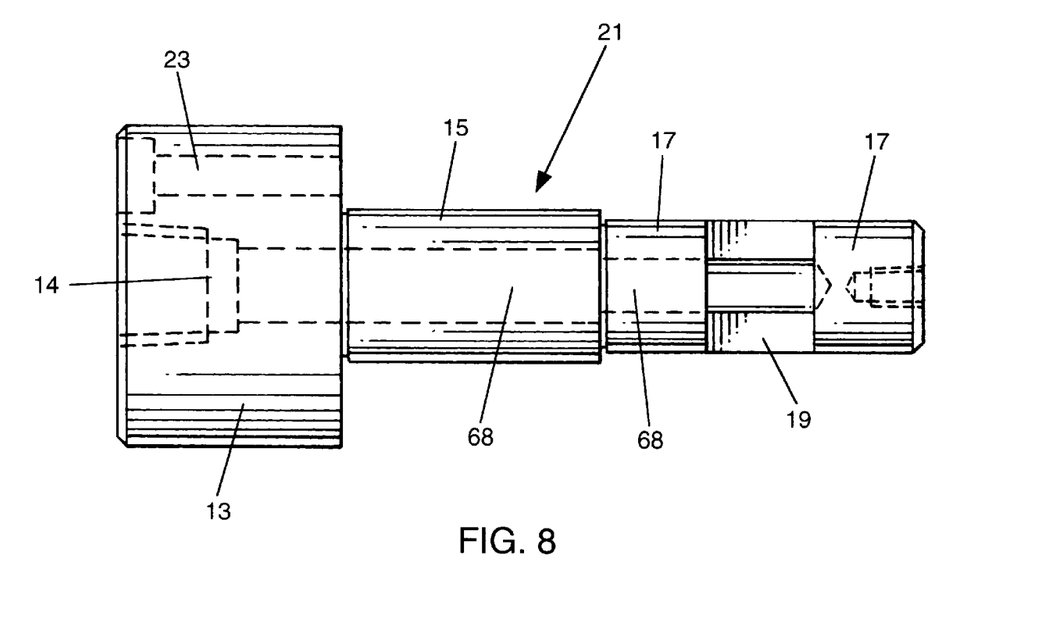
FIG. 8 is a front sectional view of an alternative axle means for conveying vacuum to the rotating collar during a specified amount of rotation of said collar.

FIG. 8 shows the side view of the most preferable axle means 21 useful in this invention wherein 13 represents a rear portion having a large outside diameter, 15 represents a central portion having an intermediate outside diameter, and 17 represents a tip portion having a small outside diameter. Collar 60 is rotably attached to the tip portion 17. Preferably, the whole of 21 is constructed of metal or an alloy of metals, made by turning from a single billet by a lathe or other machining means. The whole of 21 has a vacuum passageway 68 extending from the rear portion 14 from where the vacuum source is connected, to the tip portion 17 upon which the collar rotates during normal operation of the invention. At the tip portion 17, there is a void volume 19 which is a region from which material has been cut away from the tip portion radially in a pre-selected amount equal to the number of degrees of rotation for which it is desired to have the vacuum "on" for a pickup tube connected to the rotating collar during its pass over volume 19 during the collar's normal rotation. The location of the void dictates the timing events for the pickup tubes. By selecting the location of the beginning and end of the void volume, as described angularly with respect to any arbitrary reference point about which the collar rotates, the timing and duration of the vacuum applied to the tips of the pickup tubes, as measured in degrees or radians of rotation of the hub, may be readily accomplished, and is quite easily adjusted to any location or duration desired by the user. Also shown is pilot hole 23, having internal threads, through which a fastening means such as a screw 23 (FIG. 9) may be employed to fasten the axle to the stationary surface through which the axle is located or to which it is affixed, which is preferably a stationary wall as elsewhere described herein.

Figure 9:
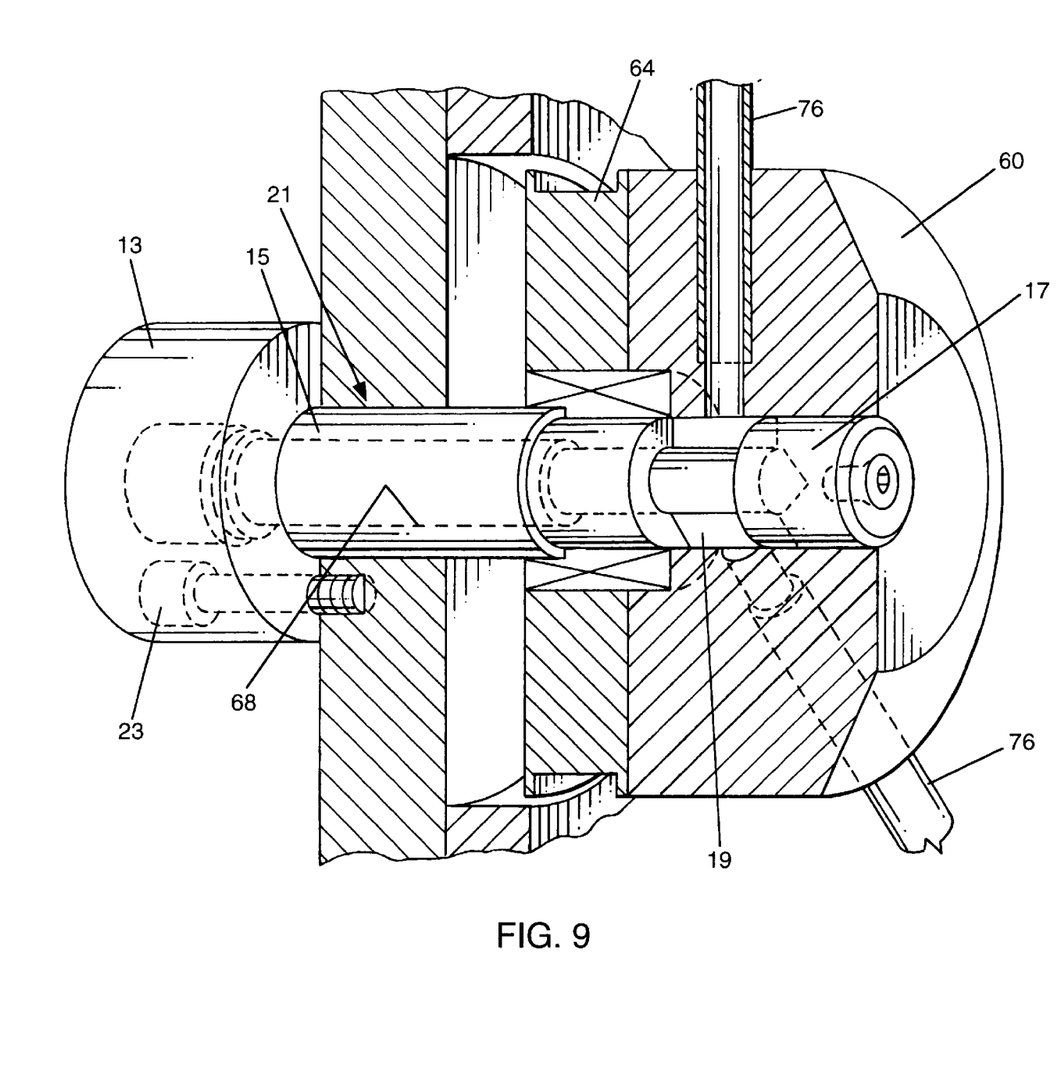
FIG. 9 is a cutaway view of an embodiment employing the alternative means shown in FIG. 8 for conveying and controlling the vacuum applied to the pickup tubes.

FIG. 9 shows the preferred embodiment of the axle portion 21 in position and its relation to other moving parts functional herein, including rotating collar 60 having pickup tubes 76 disposed thereon, pulley portion 64, and the volume 19 from which some material has been removed by machining in order to provide vacuum delivered through passageway 68 to the pickup tubes for the desired amount of time as measured by degrees of rotation of the collar coupled with its rpm. The volume of material removed may be described as a cylindrical-arc-solid section, and is reminiscent, of the shape of the volume one would obtain by cutting out about a ⅔ section of a common donut.

In the present invention, the various moving parts may be constructed of materials of varied composition without affecting the overall operation of the device as a whole, including various polymers, metals, and alloys thereof. Preferably, the rotating collar and axle are constructed of materials known for their durability following prolonged and continuous rotational contact, and for this purpose a low coefficient of friction is desired. Accordingly, the most preferred material for the axle is stainless steel and the rotating collar is made from a polymeric material well-known to those in the engineered polymer art as any grade of Delrin®. Other metals and various alloys there of may be made use of without detracting from the utility of the invention, including polytetrafluoro-ethylenes and other engineered polymers, as the choice of materials is primarily made in order to lengthen the service life of the components.

The pickup tubes are preferably composed of a material which is capable of withstanding continued contact with a volume of objects to be counted without bending or otherwise being altered in shape. Preferably, the pickup tubes are of a hollow stainless steel construction, although other materials including but not limited to wood, plastics and other metals or alloys thereof are well-suited. The main requirement is that the tubes are attachable to the rotating collar and that the point of their juncture is an air-tight seal through which no vacuum is lost under normal operating conditions. In this regard, the pickup tubes and rotating collar are preferably constructed from similar materials, such as metallic alloys or engineered polymers, in order to allow for attachment of the pickup tubes to the rotating collar by welding, the preferred means of attachment. However, threading or attachment using an interference fit or through the use of adhesives is also acceptable. As shown in FIG. 5, the inner diameter of the rotating collar is preferably only slightly larger than the outside diameter of the axle upon which it rotates. This is so that a vacuum source from say, a common vacuum pump which is connected on the exterior of the device at vacuum inlet 70 of FIG. 4 is able to communicate the vacuum through passageway 68 and to the machined groove 88 in axle 62 by way of the channel 41. The groove 88 is preferably machined into the outer surface of the axle upon which the rotating collar rides, and the groove is positioned so that the open ends of the pickup tubes at the point at which they are attached to the collar are in substantial alignment with the groove on the axle. Under such configuration, vacuum loss is kept to an absolute minimum, and the rotating collar rides on a cushion of air between itself and the axle. Since the groove is not completely coextensive with respect to the outer surface of the axle, the points at which the pickup tubes are attached to the collar shall necessarily reach a point, owing to the collar's rotation, when vacuum is no longer available. That is, the point of attachment of the tubes reach a region on the axle where there is no groove on the axle surface. At this point the vacuum is cut off and any one of the objects 100 which is attached to the outer end of a pickup tube no longer under vacuum is free to become detached from the tube end owing to aforesaid inertial and/or gravitational influences. The presence of the opening of the exit chute (containing a counting means disposed therein) at this point ensures that the object to be counted may be registered by the counter.

In the most preferred form of the invention, the counting means is contained within an enclosure as shown in the various figures, although an enclosure is not absolutely necessary. In such instances where an enclosure has been deemed desirable, the enclosure itself may be of a rectangular-solid in dimension. Preferably, as shown in FIG. 1 the reservoir region has rounded lower and side contours, as better shown in FIG. 2 and FIG. 3. FIG. 2 depicts a most preferred form of the invention showing the preferred relationship between the arc struck out at the tips of the pickup tubes by virtue of their motion 31, the radius 29 of the bottom of the enclosure, and the radius 18, different than that of 29, which is instrumental in increasing the number of objects to be counted which stick to the ends of the pickup tubes by providing a zone of reduced congestion in close proximity to the junction of the arcs 29 and 18. Whether the dimensions are rectangular or rounded are of little consequence to the fundamental function of the device, however the rounded design is preferred.

The rotation of the collar and pickup tubes attached thereto is effected by transfer of motive energy from an electrical motor or other drive means, preferably through a belt, to the collar. However, a cog belt, drive chain, series of gears, or any other means well known to those of ordinary skill in the mechanical arts for conveying rotational motive energy from a motor to another rotating member is herein indicated as a functionally equivalent means for transferring rotational energy to the collar. As shown in FIG. 4, the collar preferably includes a means 64 for receiving a drive belt 54 in the most preferred form of the invention. However, the belt receiving means could just as well be a gear, pulley, driveshaft and differential gears, positraction or limited-slip, or other similar fixture or feature. Preferably, the drive means of the collar is an integral part of the collar construction, although this is not necessary for functional equivalency to exist.

The drive means 50 is preferably an electrical motor, the speed of which may be readily varied for fine-tuning of optimum system performance. In the figures, the motor is shown as being a part of the device; however, the motor may be remotely located on a tabletop, frame, or other location, provided that motive energy is transferred to the collar. The motor may be powered by alternating or direct current, and the speed of the motor may be controlled using any one of various means available and well-known to those of ordinary skill in the electrical arts. It is preferable that the motor is somewhat rigidly affixed to the device and that its output is effectively communicated to the collar 60 to cause rotation of the collar. Motive energy may also be conferred, in the case of an enclosed device according to this invention, by the winding of a clockspring which drives a miniature vacuum pump and the rotating collar simultaneously, in synchronous. Suitable clocksprings and associated mechanisms have been known for centuries.

When the point is reached during the rotation of the collar that a vacuum is no longer available to a given pickup tube, an object 100 which was formerly attracted to the end of the pickup tube by virtue of the presence of the vacuum is free to become detached from the end of the pickup tube. If the cessation of vacuum occurs precisely when the object 100 is over the opening 22 of the discharge chute 20, then the object will fall into the exit chute. The precise timing of the cessation of vacuum is a critical factor, since if the vacuum ceases too soon, the object will never make it into the exit chute, and if the vacuum ceases too late, the object will suffer a similar fate. By providing a means for adjusting the location of the groove on the axle with respect to the enclosure, such as by permitting the turning of the axle with respect to the device as a whole, the most desired exact position can be achieved. By loosening nut 72 in FIG. 4 such an adjustment may be readily accomplished for this embodiment. The groove in the axle extends from the three o'clock position to about the one o'clock position with respect to the center of the axle shown in FIG. 2, or about 300 degrees of rotation, beginning at the lowermost position possible. By having the opening of the discharge chute coincident with the point of vacuum cutoff, successful delivery of the objects into the discharge chute is guaranteed. Alternatively, the location of the opening of the exit chute may be alterable by virtue of the exit chute being pivotally mounted within about one inch of exit portion 24 with its opening in sufficient proximity to the location at which the vacuum is cut off at the tip of the pickup tube in order that adjustment of the opening's location is effective at assisting in the deposition of an object to be counted into the exit chute.

Along the throat of the discharge tube there is located a counting means which may be any one of several counting means in common usage, as such means are well-known to those of ordinary skill in the electrical arts. Preferably, though, the counting means is of the photoelectric sensing type, including without limitation those having a beam source and a beam sensor. These counters operate on the principle that a count is registered each time the beam is broken. The registered counts are recorded by any of various means well-known, however the most preferable means is to record the counts in a computer or microprocessor memory. The most preferred means for counting and recording the counts is the Programmable Logic Controller, model #1761-L32BBB made by the Allen-Bradley company of Milwaukee, Wis. The most preferred means for displaying the counts and entering the set point is PanelView™ model 2711-B5A2, also available from Allen-Bradley. This combination is readily assembled by one of ordinary skill in the art so that after a preset number of counts is reached, a voltage pulse or other signal is sent to an alarm and/or an actuating means. In such fashion, an actuating means 44 can be caused to close the trap door 46 to deny admission of further quantities of objects into the discharge chute. Simultaneous sounding of an alarm or sending of a trigger voltage to another transducer is a convenient way to alert an operator that a desired number has been reached.

Since the number of available means for sensing events and processing simple information in the form of counts are well-known to those of ordinary skill in the electrical arts, it follows that the particular combination referred to above is for illustrative purposes only of the preferred embodiment hereof and should not be considered delimitive hereof in any way. Alternatively, the device may simply be set up with a counting means for the purpose of counting objects for an extended time period after which the counter is read and the container housing the objects is removed for storage elsewhere. While there are a large number of counter means which are functionally equivalent in their suitability for use in the instant invention, the most preferred counter for this invention is Gemini model #GEM2 made by the Red Lion Controls Company of York, Pa.

The door means 46 which is activated by the actuator 44 may be of several types of doors with the only requisite being that the door means must positively admit or prohibit admission of an object to be counted into opening 22 of chute 20. The door may be of the simple flap type on a hinge, as shown in FIG. 1, may comprise two doors which are connected by means of a lever or gears to open and shut in synchronus either outwardly or inwardly from the opening of the chute, or may be of the iris type or any other type of door, provided that the location of the door about the opening is controllable by the actuating means 44.

The actuator 44 may be of several types available. Actuators are well known in the art of electrical controls. The requisites of the actuator used in this invention is that it must be capable of mechanizing the door portion 46 so as to effectively seal off the opening of the discharge chute in order to deny entry of objects to be counted. Such actuators may comprise solenoids or the like which are either normally-open or normally-closed, depending on the circuitry selected, the elementary design of which is well-within one of ordinary mechano-electrical skill. Preferably, the actuator is Model Number 810-282-530 made by Lucas Ledex of Vandalia, Ohio.

The connecting means shown in FIG. 6 are merely pluralities of electrical conduits (wires) that serve to connect the necessary elements of the electrical controls of the invention together. The connection of these devices is well within the skill of one of ordinary skill in the electrical arts.

The location of counting means 82 within the opening of the discharge chute is a critical aspect of the invention, since upon the sensing of the last of the objects to be counted in a given use of the device, further deposit of objects must not be permitted. It has been discovered that it is most preferred to locate the counting means just inside the opening 22 of the chute 20 so that when the last of the objects is sensed, the actuating means is instantly energized, thus closing off the opening of the discharge chute. Therefore, the counting means is located at the minimum distance from the opening of the chute.

Although two embodiments comprising different means for controlling the timing of the application of the vacuum to the tips of the pickup tubes has been described herein, other means for accomplishing the same result exist and are to be considered as equivalent for purposes of the function they carry out in view of their role as necessary element of the present invention. Other equivalent means, such as the use of a single pickup tube in conjunction with an indexing wheel and a position sensor (such as those in common use by manufacturers of gasoline engines for over two decades for sensing the positions of the crankshaft for purposes of controlling spark timing, as such various electronic means for sensing the angular position of a rotatable member are very well-known to those of ordinary skill in the art) coupled with a control means for opening and closing a solenoid-actuated valve which is in series with the vacuum circuit of this invention, or a mechanical or solid state switch in an electrical series circuit with an electric pump used as the vacuum source for the instant invention, may be successfully employed herein.

The present invention contemplates the use of a short blast or "puff" of pressurized air to be communicated to the tips of the pickup tubes just before the instant at which release from the pickup tube of the object to be counted is desired. This may be readily accomplished when the vacuum is supplied by an electrically-driven vacuum pump, by reversing the polarity to the vacuum pump at the moment desired. Alternatively, a hole may be drilled in the surface of the portion of the axle where the pickup tube is to be located at the time the puff of air is desired, and the hole is in contact with ambient pressure. Under such an arrangement, vacuum is felt by the pickup tube during the rotation of the hole in the collar over the "vacuum-on" zone of the axle, however, a point is reached when the hole in the collar would be caused by its rotation to reside over the hole just mentioned. In such case, a short blast or puff of air would rush in to the pickup tube and push the object to be counted from the tip of the pickup tube.

Consideration must be given to the fact that although this invention has been shown and described with respect to certain preferred embodiments, it is obvious that equivalent alterations and modifications will occur to others skilled in the art upon the reading and understanding of this specification and the claims appended hereto. The present invention includes all such equivalent alterations and modifications, and is limited only by the scope of the claims which follow.

We claim:

1. A device for singulating and transporting objects which comprises:
   a) a rotating collar means, said collar means having an inner surface and an outer surface with at least one hole passing through said collar means between said surfaces;
   b) at least one hollow pickup tube having a collar-end portion and a pickup-end portion, said collar-end portion of said tube being attached to the collar means over said hole in such fashion so as to be radially disposed about said collar means;
   c) an axle having two end portions wherein at least one end portion has an outer surface adapted to receive the rotating collar means, said outer surface including a void volume extending less than coextensively about the end portion upon which the rotating collar means is received, said void volume disposed in fluid contact with said at least one hole in said collar means, said axle further including a hollow passageway in its interior and in which the passageway is in fluid contact with at least a portion of the inner surface of said collar means, and the passageway is adapted to be connected to a source of vacuum; and
   d) means for causing rotation of said collar means about said axle, wherein the collar is rotably disposed about the axle.

2. The device of claim 1 wherein said hole has a cross sectional area which is equal to or less than the cross section of the hollow region of said pickup tube.

3. The device according to claim 1 wherein said at least one pickup tube has a configuration selected from the group consisting of: linear, curved, s-shaped, or bent.

4. The device according to claim 1 further comprising means for sensing the angular position of said collar means about said axle.

5. The device according to claim 1 further comprising a plurality of objects to be counted wherein said objects are present in a location such that they are caused to adhere to said pickup-end portion of said pickup tube upon application of vacuum to said pickup tube upon rotation of said collar means about said axle.

6. The device according to claim 1 further comprising an enclosure having an interior volume defined by the following enclosure elements:
   i) a top portion;
   ii) a bottom portion;
   iii) a front portion;
   iv) two side portions; and
   v) a planar rear portion, wherein said axle is securely affixed to said rear portion so that the centerline of said axle is essentially perpendicular to the plane of the rear portion.

7. The device according to claim 6 further comprising a loading hole disposed on at least one of said enclosure elements.

8. The device according to claim 7 further comprising: a feed chute having a loading opening and a discharge portion, said feed chute being disposed on at least one of said enclosure elements such that the discharge portion of said feed chute is in contact with said loading hole.

9. The device of claim 1 wherein the axle end portion having a surface adapted to receive the rotating collar is shaped essentially as a cylinder and in which the hollow passageway extends from an end portion of said axle along the length dimension of said axle end portion, and in which the passageway is in fluid contact with at least a portion of the inner surface of said collar means by virtue of said void volume to allow communication of a vacuum connected to said passageway with the pickup-end portion of said pickup tube.

10. The device of claim 9 wherein said void volume is sufficient to permit communication of a vacuum from said hollow passageway to said pickup-end portion of said pickup tube for less than 360 degrees of rotation of said collar means about said axle when the collar means is rotating and a vacuum is applied to the hollow passageway.

11. The device of claim 10 wherein said void volume is a groove.

12. The device of claim 11 wherein said groove traverses between 141 degrees and 330 degrees of the total circumference on the outer surface of the axle.

13. The device of claim 10 wherein vacuum is available at the pickup-end portion of said pickup tube for between 100 degrees 330 degrees of rotation of said collar means about said axle.

14. The device according to claim 10 wherein vacuum is conveyed to said pickup-end portion of said pickup tube for between 90 degrees and 330 degrees of rotation of said collar means.

15. The device according to claim 10 wherein vacuum is conveyed to said pickup-end portion of said pickup tube for between 120 degrees and 300 degrees of rotation of said collar means.

16. The device according to claim 10 wherein vacuum is conveyed to said pickup-end portion of said pickup tube for between 150 degrees and 240 degrees of rotation of said collar means.

17. The device according to claim 1 further comprising an exit chute having an opening portion and an exit portion, wherein the opening portion of said exit chute is located within sufficient proximity of the path of motion of an object adhered to the pickup-end of the pickup tube that said object is caused to enter said exit chute upon cessation of adhesion of said object to said pickup end of said pickup tube.

18. The device according to claim 17 wherein said cessation of adhesion is caused by removal of vacuum to the collar end portion of said pickup tube.

19. The device according to claim 17 further comprising a means for counting said objects.

20. The device according to claim 19 wherein said counting means is located within said exit chute.

21. The device according to claim 19 wherein said counting means is electronic, and further comprising a microprocessor in cooperative electrical contact with said counting means.

22. The device according to claim 21 further comprising an actuating means having a door means in mechanical contact therewith, wherein said actuating means is in cooperative electrical contact with said microprocessor.

23. The device according to claim 22 wherein said door means is located in a position sufficient for effectively denying entry of an object into the opening portion of said exit chute.

24. The process for counting a plurality of objects comprising the steps of:
    a) providing a device according to claim 23,
    b) effecting rotation of said collar means about said axle of said device;
    c) applying a vacuum to said passageway of said axle of said device; and
    d) placing a plurality of objects in a location such that at least one object is caused to adhere to said pickup-end portion of said pickup tube of said device upon application of vacuum to said collar-end portion of said pickup tube during the rotation of said collar means about said axle.

25. The process according to claim 24 wherein said microprocessor is programmed to cause the closing of said opening portion of said exit chute after a preset number of objects to be counted have been deposited into said exit chute.

26. The process according to claim 25 wherein said objects weigh less than 50 grams each.

27. The process according to claim 26 wherein said objects comprise a pharmaceutical substance.

28. A process for counting a plurality of objects comprising the steps of:
    a) providing the device according to claim 1;
    b) effecting rotation of said collar means about said axle of said device;
    c) applying a vacuum to said passageway of said axle of said device; and
    d) placing a plurality of objects in a location such that at least one object is caused to adhere to said pickup-end portion of said pickup tube of said device upon application of vacuum to said collar-end portion of said pickup tube during the rotation of said collar means about said axle.

29. The process according to claim 28 wherein said objects are pharmaceutical medicaments selected from the group consisting of: capsules, pills, caplets, and boluses.

30. A device for singulating and transporting objects which comprises:
    a) a rotating collar means, said collar means having an inner surface and an outer surface with at least one hole passing through said collar means between said surfaces;
    b) at least one hollow pickup tube having a collar-end portion and a pickup-end portion, said collar-end portion of said tube being attached to the collar means over said hole in such fashion so as to be radially disposed about said collar means;
    c) an axle having two end portions wherein at least one end portion has an outer surface portion adapted to receive the rotating collar means, said axle further including a hollow passageway in its interior and in which the passageway is in fluid contact with at least a portion of the inner surface of said collar means, and the passageway is adapted to be connected to a source of vacuum;
    d) means for causing rotation of said collar means about said axle;
    e) an exit chute having an opening portion and an exit portion, wherein the opening portion of said exit chute is located within sufficient proximity of the path of motion of an object adhered to the pickup-end of the pickup tube that said object is caused to enter said exit chute upon cessation of adhesion of said object to said pickup end of said pickup tube; and f) a means for counting said objects, wherein the collar is rotably disposed about the axle and wherein said counting means is located within said exit chute.

31. A device for singulating and transporting objects which comprises:

a) a rotating collar means, said collar means having an inner surface and an outer surface with at least one hole passing through said collar means between said surfaces;

b) at least one hollow pickup tube having a collar-end portion and a pickup-end portion, said collar-end portion of said tube being attached to the collar means over said hole in such fashion so as to be radially disposed about said collar means;

c) an axle having two end portions wherein at least one end portion has an outer surface portion adapted to receive the rotating collar means, said axle further including a hollow passageway in its interior and in which the passageway is in fluid contact with at least a portion of the inner surface of said collar means, and the passageway is adapted to be connected to a source of vacuum; and d) means for causing rotation of said collar means about said axle;

e) an enclosure having an interior volume defined by the following enclosure elements:
  i) a top portion;
  ii) a bottom portion;
  iii) a front portion;
  iv) two side portions; and
  v) a planar rear portion, wherein said axle is securely affixed to said rear portion so that the centerline of said axle is essentially perpendicular to the plane of the rear portion.

32. A device according to claim 31 further comprising a loading hole disposed on at least one of said enclosure elements.

33. The device according to claim 32 further comprising: a feed chute having a loading opening and a discharge portion, said feed chute being disposed on at least one of said enclosure elements such that the discharge portion of said feed chute is in contact with said loading hole.

34. A process for counting a plurality of objects comprising the steps of:

a) providing a device for singulating and transporting objects which comprises:
  i) a rotating collar means, said collar means having an inner surface and an outer surface with at least one hole passing through said collar means between said surfaces;

ii) at least one hollow pickup tube having a collar-end portion and a pickup-end portion, said collar-end portion of said tube being attached to the collar means over said hole in such fashion so as to be radially disposed about said collar means;

iii) an axle having two end portions wherein at least one end portion has an outer surface portion adapted to receive the rotating collar means, said axle further including a hollow passageway in its interior and in which the passageway is in fluid contact with at least a portion of the inner surface of said collar means, and the passageway is adapted to be connected to a source of vacuum;

iv) means for causing rotation of said collar means about said axle;

v) an exit chute having an opening portion and an exit portion, wherein the opening portion of said exit chute is located within sufficient proximity of the path of motion of an object adhered to the pickup-end of the pickup tube that said object is caused to enter said exit chute upon cessation of adhesion of said object to said pickup end of said pickup tube;

vi) an electronic means for counting objects;

vii) a microprocessor in cooperative electrical contact with said electronic means for counting objects; and viii) an actuating means having a door means in mechanical contact therewith, wherein said actuating means is in cooperative electrical contact with said microprocessor, wherein said door means is located in a position sufficient for effectively denying entry of an object into the opening portion of said exit chute, wherein the collar is rotably disposed about the axle and wherein said counting means is located within said exit chute;

b) effecting rotation of said collar means about said axle of said device;

c) applying a vacuum to said passageway of said axle of said device; and d) placing a plurality of objects in a location such that at least one object is caused to adhere to said pickup-end portion of said pickup tube of said device upon application of vacuum to said collar-end portion of said pickup tube during the rotation of said collar means about said axle, wherein said microprocessor is programmed to cause the closing of said opening portion of said exit chute after a preset number of objects to be counted have been deposited into said exit chute.

35. The process according to claim 34 wherein the objects weigh less than 50 grams each.

36. The process according to claim 34 wherein the objects comprise a pharmaceutical substance.

* * * * *